United States Patent [19]
Shuler

[11] 3,942,964
[45] Mar. 9, 1976

[54] CLEAN ROOM PERFORATED FLOOR PANEL

[75] Inventor: Bernard R. Shuler, Louisville, Ky.

[73] Assignee: American Air Filter Company, Inc., Louisville, Ky.

[22] Filed: Sept. 26, 1974

[21] Appl. No.: 509,430

[52] U.S. Cl. .................. 55/494; 55/501; 55/509; 55/513; 55/515; 55/517; 55/518; 55/519; 98/33 R; 98/36

[51] Int. Cl.² ........................................ B01D 46/10

[58] Field of Search ...... 55/494, 501, 504, 507–509, 55/511, 513, DIG. 29, 419, 515, 517–519; 98/31, 33 R, 33 A, 36, 40 D

[56] References Cited
UNITED STATES PATENTS

| | | | |
|---|---|---|---|
| 2,685,345 | 8/1954 | Lindner | 55/509 X |
| 3,158,457 | 11/1964 | Whitfield | 98/33 A X |
| 3,250,063 | 5/1966 | Andrews | 55/504 X |
| 3,366,013 | 1/1968 | Madl, Jr. | 55/DIG. 29 |
| 3,487,766 | 1/1970 | Wood | 98/31 |

FOREIGN PATENTS OR APPLICATIONS

| | | | |
|---|---|---|---|
| 302,527 | 1/1955 | Switzerland | 55/501 |

Primary Examiner—Frank W. Lutter
Assistant Examiner—Kathleen J. Prunner
Attorney, Agent, or Firm—Jon C. Winger

[57] ABSTRACT

A perforated floor panel for use in the construction of a floor for a "clean room" having a return air system, and the like, which provides a controlled constant balanced pressure drop across the floor and a roughing filtration of air passing through it, the floor panel comprising a perforated floor pan, a balancing pad, and a balancing pad retainer which holds the balancing pad in position against the bottom surface of the floor pan.

5 Claims, 5 Drawing Figures

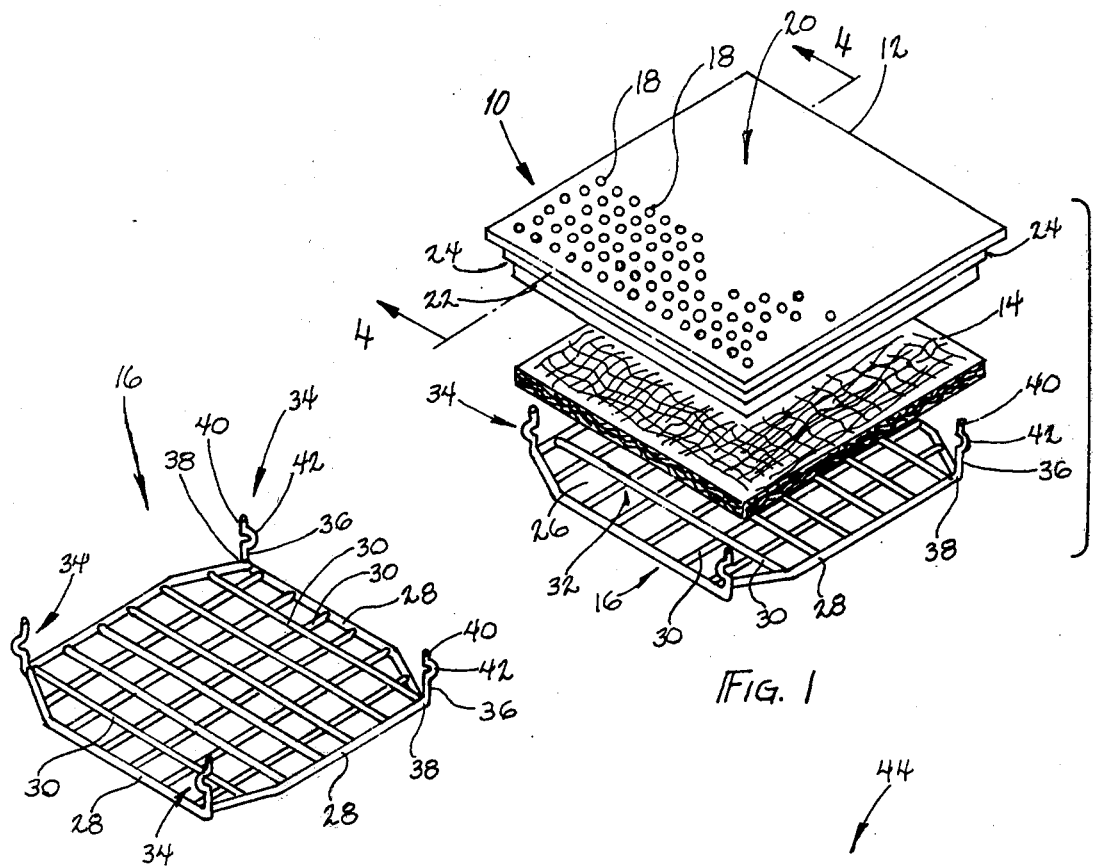
Fig. 1
Fig. 2
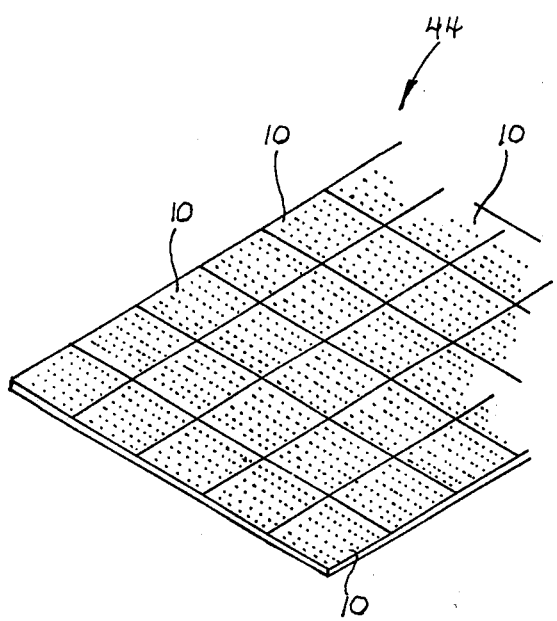
Fig. 3

CLEAN ROOM PERFORATED FLOOR PANEL

BACKGROUND OF THE INVENTION

The present invention relates to removable floor panels used for the construction of "clean room" and computer room floors, and more particularly, to a perforated floor panel.

Perforated floor panels are known and have utility in the construction of raised floors in applications requiring that an under floor space be provided. One application is, for example, computer room floors wherein an under floor space is required both for the many electrical cables supplying power to the computers, and a supply air plenum connecting the discharge of an air conditioner and the air intakes at the base of computers housed in the room.

Another application wherein perforated floor panels are particularly suited is for floors in "clean rooms" having a vertical laminar flow ventilating air system wherein the under floor space is utilized as an air return plenum.

It is extremely important in vertical laminar flow clean rooms that a controlled balanced laminar flow of ventilating air be maintained to continuously wash the entire "clean room" with a uniform amount of clean air. If a balanced laminar air flow is not maintained, turbulence and eddys will result which will catch contaminants and recirculate them throughout the room instead of carrying them out of the room through the return air plenum beneath the floor.

Balancing the air flow in a vertical laminar air flow clean room is generally done by, basically, two different methods:

1. Arranging solid and perforated floor panels making up the floor by trail and error to achieve a pattern of perforated floor panels which provides a balanced laminar flow.
2. Placing dampers to the underside of the perforated panels and adjusting them to allow different volume rates of flow-through individual panels until a balanced air flow is achieved.

Interchanging or shifting perforated and solid floor panels is a primitive way to balance the air flow in a clean room and only approaches laminar flow, but does not attain it because a portion of the floor is formed of solid panels. Usually, it is required that the floor panels are arranged so that the air return side of the room closest to the fans of an air circulating system servicing the room has only solid floor panels while the opposite side has all perforated floor panels. As soon as equipment is installed in the room, it becomes out of balance causing the air at the fan side of the room to cascade across the floor as it flows to the perforated panels, thus, eliminating any semblance of laminar flow.

Dampers, theoretically, provide unlimited adjustment of the amount of air flow passing through the floor so that the floor can be arranged in a checkerboard pattern of solid and perforated floor panels. However, in application, they do not properly perform the function of producing a laminar flow. While the air flow pattern can be balanced by adjusting the dampers, if any equipment housed in the room blocks one perforated panel or one damper is subsequently moved, the flow through the entire floor can be unbalanced. Further, the damper setting can be easily inadvertently altered by cleaning crews when they lift the panel to clean it. Indeed, even a force applied to the floor surface of the panel can distort it sufficiently to cause a change of the damper setting. In addition, dampers are relatively expensive and can be noisy, the noise being a disturbing influence to the concentration of persons performing delicate tasks within the room.

SUMMARY OF THE INVENTION

The present invention recognizes and solves the shortcomings of the prior art perforated floor panels by providing a perforated floor panel which produces a constant controlled pressure drop and which concurrently functions as a roughing filter to capture particles that would otherside drop into the floor plenum. More particularly, the present invention provides a perforated floor panel for producing a controlled constant pressure drop across the floor of a clean room, and the like, the floor panel comprising: a floor pan comprising a planar perforated floor portion having an exposed top surface and an opposite bottom surface; a fiberous balancing pad disposed against the bottom surface of the pan; and balancing pad retainer means removably attached to the floor pan for retaining the balancing pad in position against the bottom surface of the pan.

DESCRIPTION OF THE DRAWINGS

A better understanding of the present invention will be had upon reference to the accompanying drawings wherein like numerals refer to like parts throughout the several views and in which:

FIG. 1 is a perspective exploded view of a perforated floor panel of the present invention;

FIG. 2 is a perspective view of a balancing pad retainer of the present invention;

FIG. 3 is a fragmented perspective view of a floor constructed of a plurality of floor panels of the present invention;

DESCRIPTION OF THE PREFERRED EMBODIMENT

First, with reference to FIG. 1 there is illustrated a perforated floor panel, generally denoted by the numeral 10, comprising a generally rectangular perforated floor portion 12, a fluid pervious balancing pad 14 and balancing pad retaining means 16.

Figure 4:
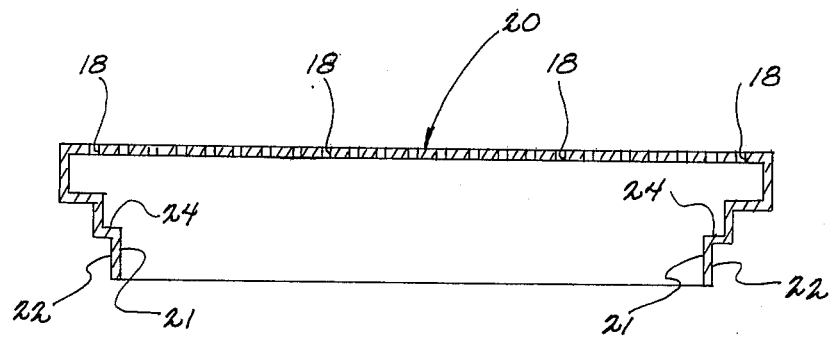
FIG. 4 is a sectional view of a floor pan comprising the floor panel taken in the direction of arrows 4—4 in FIG. 1; and, FIG. 5 is a sectional view of a floor pan similar to FIG. 4 and additionally showing a retaining clip of a peripheral frame member engaged therein.

With continued reference to FIG. 1, the perforated floor portion 12 consists of a plurality of spaced, generally uniform perforations 18, a planar top surface 20, a bottom surface (not shown) generally parallel to the top surface 20, and a depending peripheral flange 22 extending downwardly from the periphery of the bottom surface. With continued reference to FIG. 1 and additional reference to FIG. 4, depending peripheral flange 22 is formed with a peripheral ledge or shoulder 24 spaced from and generally parallel to the bottom surface of the perforated planar floor portion and extending inwardly of the space defined by the portion of the peripheral flange which is adjacent to the periphery of the bottom surface of the perforated floor portion.

The balancing pad 14 consists of a generally rectangular mat of fiberous material suitable for rough filtering, such as fiberglas, and having a generally uniform composition thickness.

With reference to FIG. 2, the balancing pad retainer means 16 comprises a generally rectangular planar grid-like structure, generally denoted as the numeral 26 comprising a peripheral frame member 28, a plurality of spaced crossed rod members 30 connected to each other at their intersections 32 and connected to the frame member 28 at their ends, and a plurality of, such as four, retaining clips 34. The spacing between the rod members 30 should be great enough to effect vertically no resistance to the flow of air through the grid-like structure.

Figure 5:
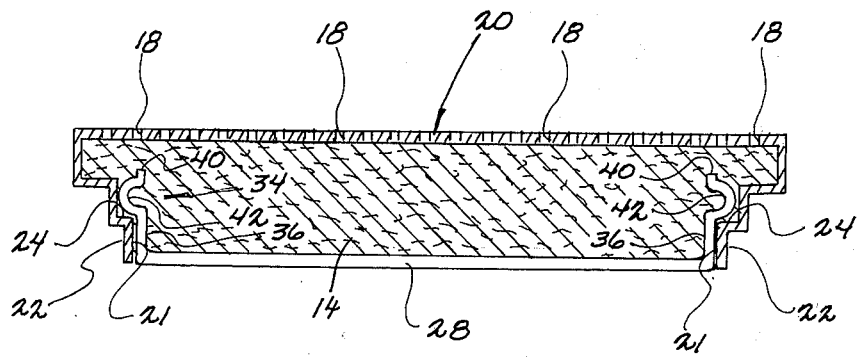

For exemplary purposes, four retaining clips 34 are illustrated, one being located at each corner of the rectangular grid-like structure 26. However, any convenient number of clips 34 greater than four would work. Each clip 34 comprises a resilient elongated rod 36 attached at one of its ends 38 to the peripheral frame member 28 and projecting generally perpendicularly from the plane of the grid-like structure, and having its other end 40 a free end. A tongue 42 comprising a generally U-shaped bend in the rod 36 is formed between its ends 38, 40. The tongue 42 projects generally outwardly of the rectangular grid-like structure 26 to engage the ledge 24 (see FIG. 5).

The fluid pervious balancing pad 14, which can be of a fibrous material, is preferably rectangular and is installed in the space defined by the peripheral flange 22 and the bottom surface of the floor pan 12. The balancing pad retaining means 16 is installed so that grid-like structure 26 overlays the exposed surface of the balancing pad in spaced relationship to the bottom surface of the floor pan 12 and so that each of the clips 34 extends generally upwardly between the margin of the balancing pad 14 and the inner face of peripheral flange 22. The tongue 42 of each clip 34 nestingly engages the ledge 24, thus, retaining the balancing pad 14 in place (see FIG. 5). It should be noted that the resilient nature of the clips 34 permits the elongated rod 36 to be displaced generally inwardly of the grid-like structure allowing the tongue 42 to ride along the inner surface 21 of the flange 22 as the clip 34 is being inserted between the margin of the balancing pad 14 and peripheral flange 22, and to resiliently move generally outwardly of the grid-like structure 26 when the tongue 42 is in position to engage the ledge 24.

Now turning to FIG. 3, there is shown a fragmented portion of an elevated perforated floor 44 constructed entirely of a plurality of perforated floor panels 10 adjacently disposed in side-by-side relationship. The details of the structure of the floor framing supporting the perforated floor panels 10 is well known in the art. One conventional floor framing support structure comprises a plurality of pedestals disposed in a checkerboard array such that the top end of each pedestal engages and supports the corner of each of four adjacently disposed floor panels. Another common floor framing support structure also employs pedestals spaced along a line corresponding to the juncture of adjacent rows of floor panels. A stringer in the form of, for example, an inverted T-beam is laid horizontally across the top end of each row of pedestals. Each stringer engages the floor panels of adjacently disposed rows of floor panels. These, and other floor framing support structures, are conventional and well known in the art and because they do not comprise any part of the present invention are not illustrated or further described.

The perforated floor 44 formed entirely of perforated floor panels 10 provides a floor which has a controlled uniform pressure drop across it over the entire floor surface of a room in which it is installed. Thus, the entire floor surface is initially adjusted upon installation to provide the same pressure drop resulting in vertical laminar air flow of ventilating air as it flows into the room from a ceiling air supply (not shown) and out of the room through the floor 44. It has been determined in practice that once the pressure drop across the entire floor surface has been balanced, no further balancing or adjustment to the balance is required regardless of equipment locations or personnel movement within the room.

It is believed that the pressure drop across the floor panels caused by the floor impeding balancing pad resists changes in the pressure differential across the floor panel, and that temporary unbalances created by movement of persons or objects within the room obstructing particular floor panels which might otherwise cause the air flow to be redirected to other unobstructed floor panels, thus, destroying vertical laminar air flow, are thereby resisted.

An additional benefit derived from the fibrous balancing pad 14 is that it functions as a rough filter media as well as a pressure drop inducing means to filter larger particles of contaminents from the air passing through it. This filtering function has the advantage of preventing large particulate matter from falling into an under floor air return plenum usually formed beneath the floor 44 and being circulated to ceiling filters and return air fans which usually form the ceiling air supply system of the clean room, thus, extending the periods of time between which the ceiling filters must be cleaned.

It should further be recognized that the balancing pads can be easily removed for cleaning or replacement and reinstalled without upsetting or changing the initial balanced pressure drop across the floor 44.

The foregoing detailed description is given primarily for clearness of understanding and no unnecessary limitations should be understood therefrom, for modifications will be obvious to those skilled in the art upon reading this disclosure and may be made without departing from the scope of the appended claims.

What is claimed is:

1. A perforated floor panel comprising:
   a. a floor pan comprising:
      a perforated planar floor portion having a top surface and an opposite bottom surface;
      a flange extending downwardly from the periphery of said bottom surface; and,
      a ledge formed in said peripheral flange spaced from and generally parallel to the bottom surface of said perforated planar floor portion, said ledge extends inwardly from the portion of said peripheral flange which is adjacent to the periphery of said bottom surface of said planar floor portion and into the space defined by that portion of said peripheral flange adjacent to the periphery of said floor pan bottom surface;
   b. a fluid pervious balancing pad removably disposed within the space defined by said peripheral flange and said floor pan bottom surface, and in abutting juxtaposition with said floor pan bottom surface; and,
   c. balancing pad retaining means comprising:
      a peripheral frame member;

a generally planar grid-like structure of spaced crossed rod members connected to each other at the point of intersection and attached at their ends to said peripheral frame member; and a plurality of retaining clips spaced equally around and attached to said peripheral frame member, each of said retaining clips comprising:

a resilient elongated rod attached at one end to said peripheral frame member and having its other end free; and, a tongue formed between the ends of said elongated rod, said tongue projecting outwardly of said grid-like structure and resiliently nestingly engaging said ledge formed in said peripheral flange to captively hold said grid-like structure in spaced relationship to said bottom surface of said floor pan and captively containing said balancing pad between said floor pan bottom surface and said planar grid-like structure and holding said balancing pad against said bottom surface of said planar floor portion.

2. The floor panel as defined in claim 1, wherein said tongue comprises a generally U-shaped bend formed in said elongated rod.

3. The floor panel as defined in claim 2, wherein said elongated rod projects generally perpendicularly from the plane of said planar grid-like structure.

4. The floor panel as defined in claim 1, wherein:

said planar perforated floor portion is substantially rectangular; and, said planar grid-like structure is substantially rectangular.

5. The floor panel as defined in claim 4, wherein said retaining clips are four in number and are generally equally spaced around the periphery of said planar grid-like structure.

* * * * *